(12) United States Patent
Patsouras et al.

(10) Patent No.: US 10,789,927 B2
(45) Date of Patent: Sep. 29, 2020

(54) STRUCTURE-BORNE SOUND ACTUATOR FOR A MOTOR VEHICLE, AND MOTOR VEHICLE

(71) Applicant: Continental Automotive GmbH, Hannover (DE)

(72) Inventors: Dimitrios Patsouras, Hannover (DE); Robert Joest, Hannover (DE); Johannes Kerkmann, Hannover (DE); Jens Friedrich, Hannover (DE); Roland Bock, Hannover (DE); Thomas Gallner, Hannover (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/604,084

(22) PCT Filed: Mar. 29, 2018

(86) PCT No.: PCT/EP2018/058084
§ 371 (c)(1),
(2) Date: Oct. 9, 2019

(87) PCT Pub. No.: WO2018/188963
PCT Pub. Date: Oct. 18, 2018

(65) Prior Publication Data
US 2020/0152164 A1    May 14, 2020

(30) Foreign Application Priority Data
Apr. 10, 2017    (DE) .................. 10 2017 206 079

(51) Int. Cl.
*G10K 9/20*    (2006.01)
*B06B 1/06*    (2006.01)
(Continued)

(52) U.S. Cl.
CPC .............. *G10K 9/20* (2013.01); *B06B 1/0622* (2013.01); *B06B 1/0666* (2013.01); *B60R 2011/004* (2013.01); *G10K 9/12* (2013.01)

(58) Field of Classification Search
CPC .............. B06B 81/0622; B06B 1/0666; B60R 2011/004; G10K 9/12; G10K 9/20
See application file for complete search history.

(56) References Cited

U.S. PATENT DOCUMENTS

| 5,884,736 A | 3/1999 | Burdisso et al. |
| 6,915,696 B2 | 7/2005 | Dufait et al. |
| 2016/0107568 A1 | 4/2016 | Kang |

FOREIGN PATENT DOCUMENTS

| DE | 694771 C | 8/1940 |
| DE | 102010005138 A1 | 7/2011 |

(Continued)

OTHER PUBLICATIONS

Office Action dated Jan. 9, 2018 from corresponding German Patent Application No. 10 2017 206 079.4.
(Continued)

*Primary Examiner* — Regina N Holder

(57) ABSTRACT

The invention relates to a structure-borne sound actuator for a motor vehicle, which comprises an electro-dynamic excitation unit, and the excitation unit is formed with an excitation side configured to excite an acoustic body, wherein an acoustically rigid intermediate element is secured to the excitation side and the intermediate element has a coupling side, which faces away from the excitation side, and is configured for coupling to the acoustic body.

8 Claims, 3 Drawing Sheets

(51) Int. Cl.
  *B60R 11/00* (2006.01)
  *G10K 9/12* (2006.01)

(56) References Cited

FOREIGN PATENT DOCUMENTS

| DE | 102015109281 A1 | 12/2016 |
| EP | 2839990 A1 | 2/2015 |
| EP | 3095530 A1 | 11/2016 |
| RU | 2029444 C1 | 2/1995 |

OTHER PUBLICATIONS

International Search Report and Written Opinion dated Aug. 13, 2018 from corresponding International Patent Application No. PCT/EP2018/058084.

STRUCTURE-BORNE SOUND ACTUATOR FOR A MOTOR VEHICLE, AND MOTOR VEHICLE

BACKGROUND

The invention relates to a structure-borne sound actuator for a motor vehicle, which comprises an electro-dynamic excitation unit. The excitation unit is formed with an excitation side configured to excite an acoustic body. The invention also relates to a motor vehicle having a corresponding structure-borne sound actuator.

Structure-borne sound actuators are known from the prior art. In order to excite surfaces acoustically according to the flexural wave principle, structure-borne sound actuators are used in the audio range. These actuators are equivalent in their functioning method to conventional loudspeakers with a diaphragm, as both are based on an electro-dynamic transducer principle. Both systems differ in their structure to the extent that structure-borne sound actuators have no diaphragm, no surround and no loudspeaker basket, and are therefore considerably lighter and smaller in comparison to conventional loudspeakers with diaphragms. However, structure-borne sound actuators usually require a suitable excitation surface for sound emission.

To provide a broadband emission of sound waves, actuators must therefore be coupled to a suitable surface or to an acoustic body. This coupling implements a transmission of the vibrations generated by the actuator in the sound body or acoustic body. This causes flexural vibrations to form in the entire excitation surface. These become audible due to the airborne sound excited by the vibrating acoustic body.

The type of coupling of the actuator to the acoustic body is therefore crucial for an optimal transmission and a high degree of efficiency of the vibration system. Modern structure-borne sound actuators are often secured directly to the surface to be excited or acoustic body with an adhesive bond or screw connection. To do so, between the fixed part of the actuator and the surface, a direct connection is created, which usually corresponds in its dimensions to the diameter of the coil holder or the magnet. This form of direct coupling primarily fulfils the purpose of providing a long-term stable mounting between the excitation source, or structure-borne sound actuator, and the acoustic body itself.

BRIEF SUMMARY

It is an object of the present invention to create a structure-borne sound actuator and a motor vehicle, with which an acoustic body can be more effectively excited.

This object is achieved by means of a structure-borne sound actuator and a motor vehicle in accordance with the independent claims.

A structure-borne sound actuator according to the invention for a motor vehicle comprises an electro-dynamic excitation unit. In particular, the structure-borne sound actuator comprises a housing and a power supply interface. The excitation unit is designed with an, in particular flat, excitation side. The excitation side is configured to excite an acoustic body. A key idea is that an acoustically rigid intermediate element is secured to the excitation side and the intermediate element has a coupling side, which faces away from the excitation side and is configured for coupling to the acoustic body.

The invention is based on the finding that by using variously designed intermediate elements, which are arranged between the excitation unit and the acoustic body, a sound emitted by the acoustic body can be manipulated. Thus, for example, a frequency and/or a volume of the sound can be manipulated. For example, the frequency can be increased or decreased. However, certain frequency bands of the sound can also be emphasized or reduced or suppressed, for example. The exact adaptation of the sound depends on the design of the intermediate element.

Thus, for example, the intermediate element can be shaped in such a way that a central portion of the (audible) frequency band of the sound emitted by the acoustic body is increased. To do so, the intermediate element can be designed in various shapes and/or with a wide variety of materials.

In particular, however, it is provided that the intermediate element is secured between the excitation unit and the acoustic body in such a way that an excitation motion of the excitation unit can be output to the intermediate element and the excitation motion can be transferred from the intermediate element to the acoustic body. The excitation unit and the acoustic body in this case are connected, in particular exclusively, via the intermediate element. Between the excitation unit and the acoustic body, there is therefore, in particular, no direct contact.

The intermediate element is designed to be acoustically rigid. In particular, this means that the intermediate element itself essentially emits no audible sound, hence no sound between 16 Hz to 20 kHz. In particular, the intermediate element is rigidly designed in such a way that the excitation unit produces substantially no flexural waves in the intermediate element that are radiated. This should be understood to include, in particular, that in the installed condition of the structure-borne sound actuator at least 95%, preferably at least 98%, of the acoustic output of the structure-borne sound actuator is emitted by the acoustic body. In particular, only at most 5%, preferably at most 2%, of the acoustic output of the structure-borne sound actuator is therefore emitted by the intermediate element.

The intermediate element is preferably connected to a movable cylinder or a movable coil element of the excitation unit. In addition or alternatively, the intermediate element can also be connected to other parts of the excitation unit or to a housing of the structure-borne sound actuator.

Preferably, it is provided that the intermediate element is designed to be planar and a surface area of the coupling side is larger than or the same size as a surface area of the excitation side. By means of the coupling side of larger surface area, the excitation motion can also be applied in a larger region of the acoustic body in terms of surface area than would be the case with direct coupling of the excitation unit with the acoustic body. It is also advantageous that the excitation unit itself, in spite of the larger surface area of the coupling side due to the intermediate element, can still be designed to be small and compact.

In addition, in one embodiment it is preferably provided that the intermediate element is pre-tensioned and in the decoupled state the coupling side is curved, in particular concavely facing away from the excitation side. Due to the initial tension, a different pressure is exerted on the acoustic body by the intermediate element. The pressure or force exerted by the intermediate element on the acoustic body is different depending on the initial tension of the intermediate element. For example, if the intermediate element is concave in the opposite direction to the excitation side, then in the peripheral region of the intermediate element a higher force is exerted on the acoustic body than is the case, for example, in a central region of the coupling side. This is true, for example, if the acoustic body is designed to be planar or flat.

If the acoustic body is also curved, then the initial tension also offers the advantage that the intermediate element can contact the curved acoustic body over a large surface area.

Furthermore, it is preferably provided that the intermediate element has a rectangular centerpiece in the plane of the coupling side with at least two crosspieces, spaced apart from each other and extending away from the centerpiece, in particular radially. The crosspieces are preferably designed identically in shape and the centerpiece is preferably square. The crosspieces extend in directions extending away from the center of the intermediate element at equal angles. Furthermore, it is preferably provided that the crosspieces extend away from the centerpiece at equal distances to each other. In the case of four crosspieces arranged on the centerpiece, a cross shape is then obtained, which means that the intermediate element is then designed in the shape of a cross. The centerpiece and the crosspieces extend in particular in the same plane. The design of the intermediate element with the centerpiece and the crosspieces is advantageous, because by means of the crosspieces a kinetic energy injection point on the acoustic body can be determined in a variety of ways. Thus, the crosspieces can be attached to the centerpiece, for example, in such a way that they extend at a certain angle from the centerpiece and also have different lengths, for example. As a result, the kinetic energy or the vibration of the excitation unit can be directed into the acoustic body via the intermediate element very precisely and in a manner appropriate to the situation.

Furthermore, it is preferably provided that the intermediate element has at least two crosspieces oriented away from the excitation side of the excitation unit, and the coupling side is formed only by ends of the bars that are oriented away from the excitation side. In this embodiment, the intermediate element is designed to be quasi-three-dimensional. The intermediate element can also have a plurality of bars oriented away. For example, due to the bars the intermediate element then appears spider-shaped or octopus-shaped, so that the bars at least partially enclose a three-dimensional air space. The bars can be designed to be curved in one or more directions. It is also possible, however, that the bars are designed to be straight. Preferably, however, it is provided that only the end of each bar oriented away from the excitation side is designed as a coupling side, and thus only that end is in contact with the acoustic body. The vibrational energy is hence only introduced at the points in the acoustic body at which the ends of the bars are in contact with the acoustic body. This is advantageous because it means that acoustic bodies designed with complex shapes can be coupled effectively and in a manner appropriate to the application in order to introduce the vibrational energy from the excitation unit.

Furthermore, it is preferably provided that the intermediate element is designed with at least two material layers extending at equal distances from the coupling side and formed, in particular, with different materials. Due to the different material layers, an initial tensioning of the intermediate element can be generated, for example. Due to the different material layers, however, it is also possible to adjust a frequency emitted by the excitation unit and therefore to have an effect on the noise emitted by the acoustic body. The intermediate element can also be formed from more than two material layers.

Preferably, it is provided that the material layers are formed using different materials. The different materials can comprise, for example, different plastics, plastic compounds, Plexiglass, aluminum, ureol, carbon, wood or glass fiber. Due to the different materials, the frequency of the excitation unit can be adjusted and output to the acoustic body in an adapted manner.

Furthermore, it is preferably provided that the intermediate element has a raised, in particular cylindrical, mounting region, on a side opposite the coupling side and configured for attaching the intermediate element to the excitation unit. Due to the mounting region, the intermediate element can be more easily and more securely attached to the excitation unit. Thus, for example, the intermediate element can be designed in such a way that only the mounting region can be attached to the excitation side of the excitation unit. The design of the mounting region can also have an impact on the adjustment of the frequency of the kinetic energy output by the excitation unit, however. In particular, the mounting region is designed to be cylindrical. The cylinder in this case is preferably formed in such a way that an axis of rotation of the cylinder comes to rest perpendicularly on the excitation side of the excitation unit.

Furthermore, it is preferably provided that the intermediate element is attached to the excitation side of the excitation unit with a non-destructively releasable connection, in particular with a screw connection. The non-destructively releasable connection means that the intermediate element can be attached to different excitation units, for example. Thus, in the event of a fault, for example, the excitation unit can be replaced by a new excitation unit. The intermediate element is not then destroyed or damaged and can continue to be used. Preferably, the intermediate element can for example also remain coupled to the acoustic body while the excitation unit is replaced. In particular, it is provided that the intermediate element is attached to the excitation unit using the screw connection, for example with one or more screws. It can however also be the case that the intermediate element is materially bonded to the excitation unit by means of an adhesive bond or a curing mastic, for example. It is however also possible for the intermediate element to be attached to the excitation unit using different types of clips.

The invention also relates to a motor vehicle having a structure-borne sound actuator according to the invention.

The motor vehicle is preferably designed as a passenger car. The structure-borne sound actuator is preferably arranged on an area of the motor vehicle which is not visible from the passenger compartment of the motor vehicle.

Preferably, it is provided that the structure-borne sound actuator is coupled to an acoustic body, in particular exclusively, with a coupling side of an intermediate element, the acoustic body being designed as an interior trim part of the motor vehicle. The interior trim part is implemented, for example, as an internal door panel trim, cockpit trim, roof interior trim, wheel arch liner, pillar trim or seat covering. The structure-borne sound actuator is preferably attached to an inner side of the interior trim part and thus cannot be seen by an occupant seated in the passenger compartment of the motor vehicle. The inner side of the cladding part is thus in particular facing towards the component of the motor vehicle which is thereby disguised.

The structure-borne sound actuator is preferably an integral component of an audio system of the motor vehicle for entertaining the vehicle occupants.

Advantageous embodiments of the structure-borne sound actuator should be regarded as advantageous embodiments of the motor vehicle.

Further features of the invention emerge from the claims, the figures and the description of the figures. The features and feature combinations cited in the description above, and the features and feature combinations cited in the description of the figures below and/or shown in the figures alone are applicable not only in the respective combination indicated but also in other combinations or in isolation, without departing from the scope of the invention.

BRIEF DESCRIPTION OF THE FIGURES

Exemplary embodiments of the invention will be explained in more detail below on the basis of schematic drawings, in which.

DETAILED DESCRIPTION

In the figures, identical or functionally identical elements are provided with identical reference signs.

Figure 1:
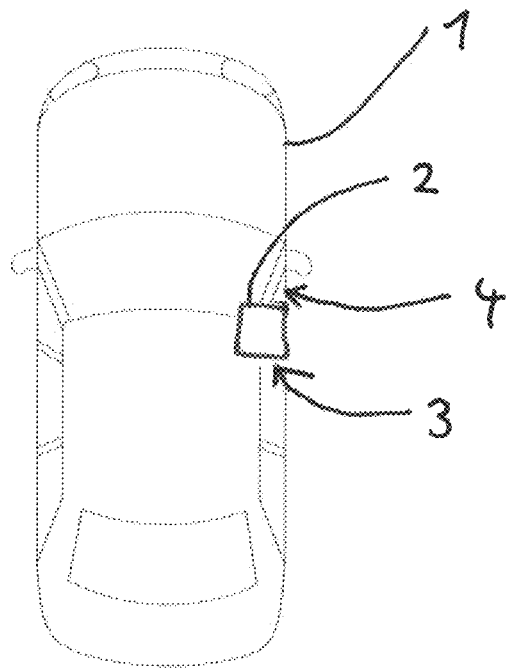
FIG. 1 shows a schematic plan view of an exemplary embodiment of a motor vehicle according to the invention having a structure-borne sound actuator.

In FIG. 1, a schematic plan view of a motor vehicle 1 with a structure-borne sound actuator 2 is shown.

In accordance with the exemplary embodiment, the structure-borne sound actuator 2 is coupled to an interior trim part 4 of the motor vehicle 1 via an intermediate element 3.

The structure-borne sound actuator 2 can also be coupled to any desired component of the motor vehicle 1, however. In the present case, the interior trim part 4 is designed as interior door trim.

The structure-borne sound actuator 2 is thus connected to the interior trim part 4, implemented as an acoustic body, solely via the intermediate element 3. Kinetic energy output by the structure-borne sound actuator 2 is then coupled into the interior trim part 4 via the intermediate element 3. The interior trim part 4 then preferably excites the air located in the interior of the motor vehicle 1 and generates sound or a noise in the audible sound range.

There are a variety of possible ways to arrange the structure-borne sound actuator 2 in the motor vehicle 1. A plurality of structure-borne sound actuators 2 can also be arranged in the motor vehicle 1. The arrangement can be positioned, for example, behind trim parts of the vehicle interior or on a glass surface, a chassis part, such as a splash guard wall, which separates an engine compartment of the motor vehicle 1 from a passenger compartment of the motor vehicle 1, or on a side member or a cross-member of the chassis of the motor vehicle.

Figure 2:
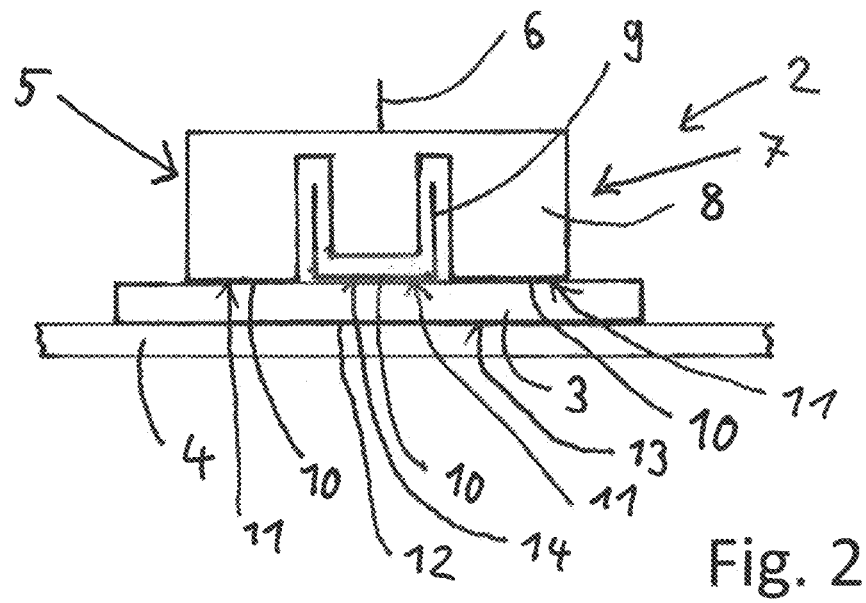
FIG. 2 shows a schematic drawing of an exemplary embodiment of the structure-borne sound actuator with an intermediate element.

FIG. 2 shows an exemplary embodiment of the structure-borne sound actuator 2. The structure-borne sound actuator 2 has a housing 5, a power supply interface 6 and an electro-dynamic excitation unit 7. The housing 5 surrounds the excitation unit 7 at least partially, and protects it, for example against the ingress of dirt and other types of contamination. The power supply interface 6 is configured to be connected to an energy supply source of the motor vehicle 1. Via the power supply interface 6, the energy required for the excitation unit 7 is provided.

The excitation unit 7 according to the exemplary embodiment has a magnet element 8 and a coil element 9. The magnet element 8 is designed to be moveable relative to the coil element 9. By applying electrical energy to the power supply interface 6, the magnet element 8 is moved with respect to the coil element 9.

According to the exemplary embodiment, the excitation unit 7 has an excitation side 10. The excitation side 10 is designed to excite the interior trim part 4. In addition, the excitation side 10 is provided by the magnet element 8 and/or the coil element 9.

The intermediate element 3 is attached to the excitation side 10. The intermediate element 3 is also attached to the magnet element 8 and/or the coil element 9. In addition or alternatively, the intermediate element 3 can also be attached to the housing 5.

The excitation side 10 is designed in particular as a flat surface in order to output kinetic energy to the intermediate element 3 or to excite the same. To perform the excitation, the coil element 9 moves relative to the magnet element 8 towards the intermediate element 3 or away from the intermediate element 3. The movement of the coil element 9 takes place in particular in the range from 16 Hz to 20 kHz.

The intermediate element 3 is secured to the excitation unit 10 with a non-destructively releasable connection 11. The non-destructively releasable connection 11 is preferably implemented as a screw connection. In this way, the intermediate element 3 can be attached to the excitation unit 7 using one or more screws. In other exemplary embodiments, not shown, the intermediate element 3 can also be glued, for example, to the excitation unit 7 or be secured to the excitation unit 7 using different types of clips or brackets. The intermediate element can also be secured to the excitation unit 7 with a hardening mastic, however. The releasable connection is provided between the intermediate element 3 and the magnet element 8 and/or between the intermediate element 3 and the coil element 9.

The intermediate element 3 has a coupling side 12 facing away from the excitation side 10. The coupling side 12 is configured for coupling to the interior trim part 4. In accordance with the exemplary embodiment of FIG. 2, the interior trim part 4 is coupled to the coupling side 12 using the intermediate element 3. The interior trim part 4 is therefore not contacted directly by the excitation unit 7. The kinetic energy unit of the excitation unit 7 into the interior trim part 4 takes place exclusively via the intermediate element 3. The intermediate element 3 modifies the transmission of force into the interior trim part 4. Thus, using the intermediate element 3, a frequency in certain regions of the frequency spectrum emitted by the excitation unit 7 can be suppressed or enhanced, for example. Thus, in particular due to its material property and/or its geometry, the intermediate element 3 influences the radiation to the interior trim part 4 with respect to an energy-specific efficiency and/or a bandwidth of the frequency emitted.

By means of the modified transmission of force via the connecting element 3 and a resulting higher efficiency and/or a broader or narrower spectral bandwidth, the structure-borne sound actuator 2, which is also referred to as a surface radiator, can be used more efficiently in terms of its size and its energy expenditure than is the case for a structure-borne sound actuator 2 without the intermediate element 3, which is thus directly connected to the interior trim part 4.

Furthermore, as a result, weight and/or installation space can also be saved, for example. For example, as a result, fewer and/or smaller structure-borne sound actuators 2 can be used than would be needed compared to a coupling to the interior trim part 4 without an intermediate element, to generate the same amount of sound or the same acoustic performance.

In particular, it is provided that a surface area 13 of the coupling side 12 is larger than or equal in size to a surface area 14 of the excitation side 10. The surface area 14 of the excitation side 10 can be obtained, for example, from the coil element 9 and/or the magnet element 8. The coupling between the intermediate element 3 and the interior trim part 4 also takes place for example using a reversible connection or a materially bonded connection, for example.

The intermediate element 3 is preferably implemented separately from the interior trim part 4. Thus, the intermediate element 3 is not a component or a layer of the interior trim part 4.

Figure 3:
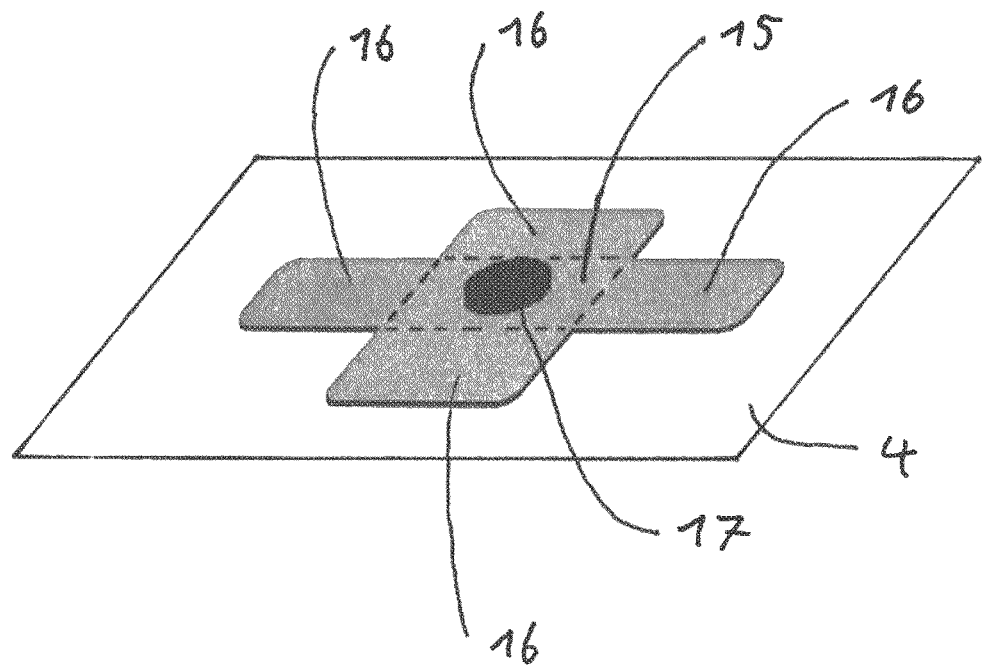
FIG. 3 shows a schematic drawing of an exemplary embodiment of the intermediate element with a centerpiece, four crosspieces and a mounting region.

FIG. 3 shows an exemplary embodiment of the intermediate element 3 coupled to the interior trim part 4. According to this exemplary embodiment, the intermediate element 3 has a rectangular centerpiece 15. In the present case, the centerpiece 15 is actually square. From the centerpiece 15, four crosspieces 16 extend in the same plane as the centerpiece 15. The number of the crosspieces 16 can vary, however at least two crosspieces 16 are preferably provided. In accordance with the exemplary embodiment, the crosspieces 16 are as wide as the centerpiece 15. The respective width of the crosspieces 16 in relation to the centerpiece 15 can also vary, however. For example, the crosspiece 16 can be wider or narrower than the centerpiece 15. In the present case, the crosspieces 16 together with the centerpiece 15 produce a cross shape.

In accordance with the exemplary embodiment, it is further provided that an external contour of the intermediate element 3 is rounded at the ends of the crosspieces 16 oriented away from the centerpiece 15. In a further exemplary embodiment, not shown, the centerpiece 15 can however also have corners instead of the rounded ends.

According to the exemplary embodiment, the intermediate element 3 also has a mounting region 17. The mounting region 17 is in accordance with the exemplary embodiment of FIG. 3 arranged on the centerpiece 15. The mounting region 17 is designed, in particular, to be cylindrical and configured for attaching the intermediate element 3 to the excitation unit 7. By the design of the intermediate element with the centerpiece 15 and the crosspieces 16, the spectral bandwidth of the energy emitted by the excitation unit 7 can be adjusted in a particularly precise way.

Figure 4:
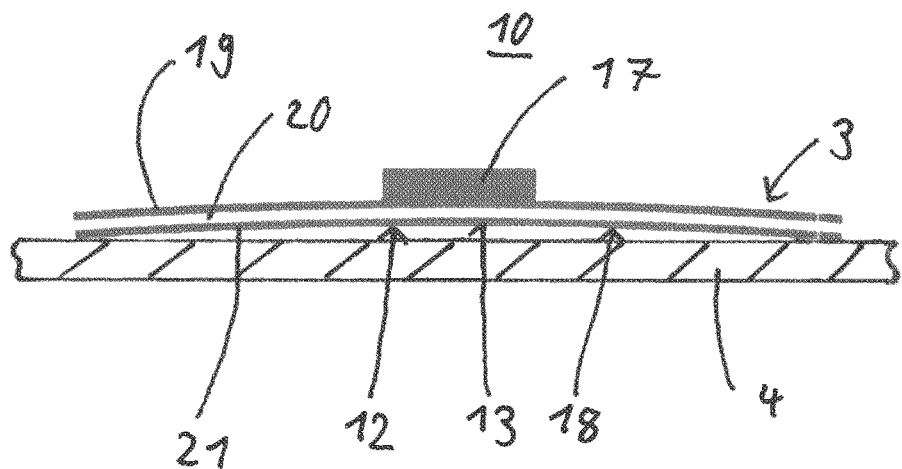
FIG. 4 shows a schematic drawing of an exemplary embodiment of the intermediate element with pre-tensioning.

FIG. 4 shows a further exemplary embodiment of the intermediate element 3. The intermediate element 3 has an initial tension 18. Due to the initial tension 18, the intermediate element 3 has a concave curvature in the direction of the interior trim part 4 if it is in the decoupled condition or in the unassembled condition. In the coupled or assembled condition, the intermediate element 3 preferably bears against the interior trim part 4 with the entire surface 13 of the coupling side 12. Preferably, the intermediate element 3 is thus pressed against or pressed onto the interior trim part 4 in the coupled condition. By means of the initial tension 18, the frequency range of the energy emitted by the excitation unit 7 can, in turn, be adjusted in diverse ways. For example, individual frequency ranges can be reduced or increased. However, for example, the entire frequency spectrum can also be expanded by means of the intermediate element 3. Furthermore, due to the initial tension 18, influence can for example be exerted on the interior trim part 4. Thus, for example, the pre-tensioning in the outer region of the intermediate element 3, in which the force resulting from the initial tension on the interior trim part 4 is greater, can be used to inject different frequencies into the interior trim part 4 in these areas than in the central area of the intermediate element 3.

Furthermore, the intermediate element according to the exemplary embodiment of FIG. 4 is designed with a first material layer 19, a second material layer 20 and a third material layer 21. The material layers 19, 20, 21 are in accordance with the exemplary embodiment formed with a uniform thickness and extending uniformly with respect to the coupling side 12. The material layers 19, 20, 21 can be formed, for example, of the same material or else of different materials. Thus, the material layers can be made, for example, of solid material, hard foam, glass, Plexiglass, aluminum, ureol, carbon, wood or glass fiber. In accordance with the exemplary embodiment, only the third material layer 21 contacts the interior trim part 4. The material layers 19, 20, 21 can be used, for example, to generate the initial tension 18.

Figure 5:
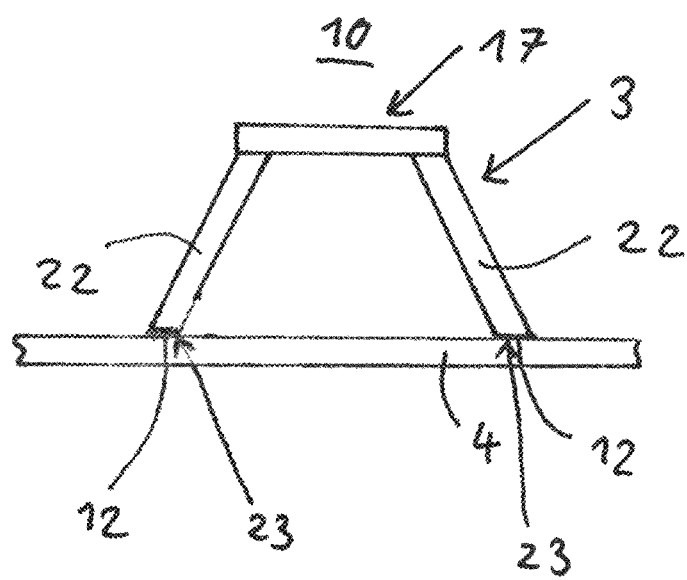
FIG. 5 shows a schematic drawing of an exemplary embodiment of the intermediate element with two bars.

FIG. 5 shows a further exemplary embodiment of the intermediate element 3. The intermediate element 3 has two bars 22 oriented away from the excitation side 10. The coupling side 12 is in this exemplary embodiment formed solely by ends 23 of the bars 22 directed away from the excitation side 10.

More bars 22 of the intermediate element 3 than those shown in FIG. 5 can also be provided. Thus, the intermediate element 3 can be implemented, for example, with a plurality of bars 22 and thus assume a spider-like or basket-like shape.

The intermediate element 3 may also be formed, for example, of metal or a hybrid plastic.

For example, it can also be the case that partial regions are cut out from the intermediate element 3 and the intermediate element 3 thus has a lattice-like or porous structure. In addition, it is possible, for example, that the intermediate element 3 has a honeycomb structure, in which the honeycombs can be implemented uniformly or in different shapes and sizes.

By means of the intermediate element 3, a frequency adjustment for frequencies emitted by the excitation unit 7 can therefore be carried out. The transmission of force into the interior trim part 4 can be achieved using the intermediate element 3 in a variety of ways, depending on the geometry and material of the intermediate element 3.

LIST OF REFERENCE NUMERALS 1 motor vehicle
2 structure-borne sound actuator
3 intermediate element
4 interior trim part
5 housing
6 power supply interface
7 excitation unit
8 magnet element
9 coil element
10 excitation side
11 releasable connection
12 coupling side
13 surface of the coupling side
14 surface of the excitation side
15 centerpiece
16 crosspiece
17 mounting region
18 initial tension
19 first material layer
20 second material layer 21 third material layer
22 bars
23 ends of the bars

The invention claimed is:

1. A structure-borne sound actuator for a motor vehicle, which comprises an electro-dynamic excitation unit, and the excitation unit is formed with an excitation side to excite an acoustic body, characterized in that an acoustically rigid intermediate element is secured to the excitation side and the intermediate element has a coupling side, which faces away from the excitation side and is configured for coupling to the acoustic body, wherein the intermediate element is planar in design and a surface area of the coupling side is larger than a surface area of the excitation side; and characterized in that the intermediate element is designed with an initial tension and the coupling side is curved in the decoupled state.

2. The structure-borne sound actuator as claimed in claim 1, characterized in that the intermediate element has a rectangular centerpiece in the plane of the coupling side, and at least two crosspieces, spaced apart from each other and leading away from the centerpiece.

3. The structure-borne sound actuator as claimed in claim 1, characterized in that the intermediate element has at least two rods directed away from the excitation side of the excitation unit, and the coupling side is formed only by ends of the rods directed away from the excitation side.

4. The structure-borne sound actuator as claimed in claim 1, characterized in that the intermediate element is designed with at least two material layers evenly spaced apart from the coupling side.

5. The structure-borne sound actuator as claimed in claim 1, characterized in that the intermediate element has a raised mounting region, formed on a side opposite the coupling side, configured for attaching the intermediate element to the excitation unit.

6. The structure-borne sound actuator as claimed in claim 1, characterized in that the intermediate element is secured to the excitation side of the excitation unit with a non-destructively releasable connection.

7. A motor vehicle having a structure-borne sound actuator, which comprises an electro-dynamic excitation unit, and the excitation unit is formed with an excitation side to excite an acoustic body, the structure-borne sound actuator characterized in that an acoustically rigid intermediate element is secured to the excitation side and the intermediate element has a coupling side, which faces away from the excitation side and is configured for coupling to the acoustic body, wherein the intermediate element is planar in design and a surface area of the coupling side is larger than a surface area of the excitation side and characterized in that the intermediate element is designed with an initial tension and the coupling side is curved in the decoupled state.

8. The motor vehicle as claimed in claim 7, characterized in that the structure-borne sound actuator is coupled using one coupling side of an intermediate element to an acoustic body, the acoustic body being designed as an interior trim part (4) of the motor vehicle.

* * * * *